(No Model.) 2 Sheets—Sheet 1.
H. TESSEYMAN.
MOTOR CAR TRUCK.
No. 581,792. Patented May 4, 1897.
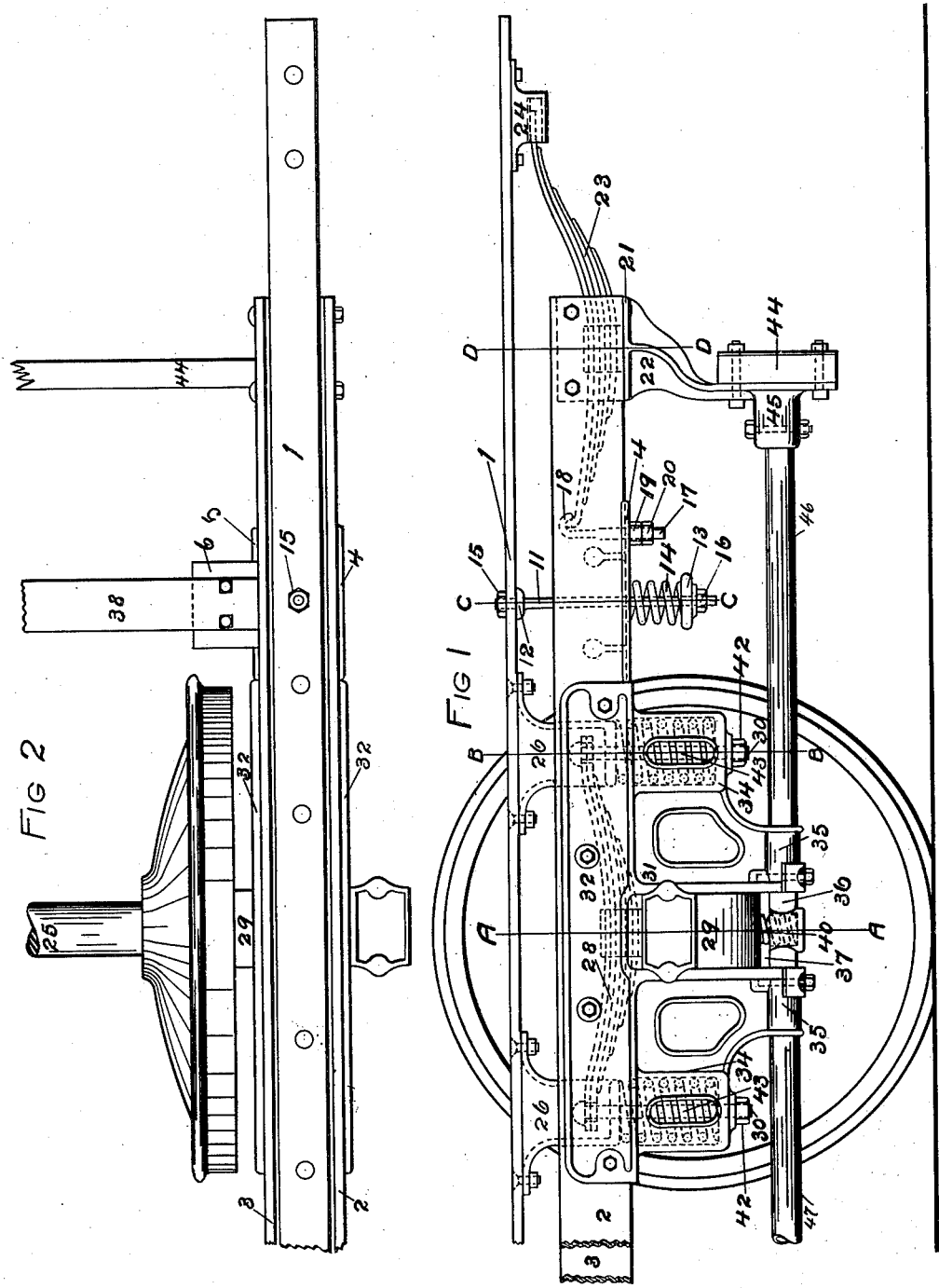
Attest.
E. L. Leland
Q. U. Raymond
Inventor.
Henry Tesseyman (No Model.) 2 Sheets—Sheet 2.
H. TESSEYMAN.
MOTOR CAR TRUCK.
No. 581,792. Patented May 4, 1897.
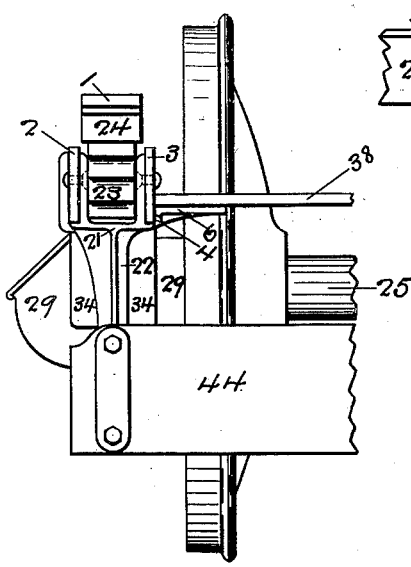
Fig. 3.
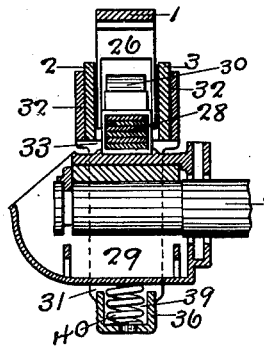
Fig. 4.
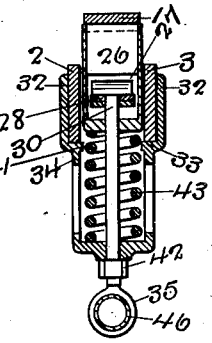
Fig. 5.
Fig. 6.
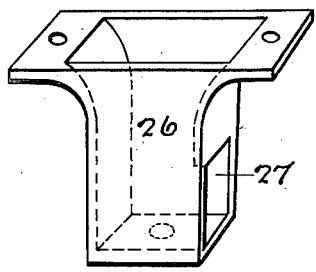
Fig. 7.
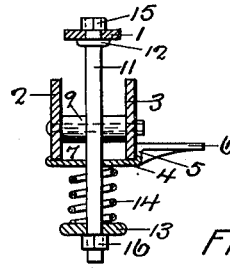
Fig. 8.
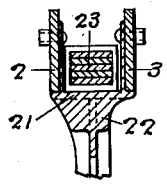
Fig. 9.
Fig. 10.
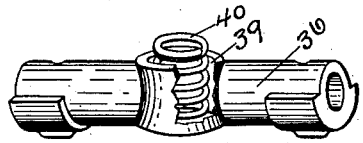
Fig. 11.
Attest.
E. S. Leland
C. U. Raymond
Inventor.
Henry Tesseyman

UNITED STATES PATENT OFFICE.

HENRY TESSEYMAN, OF DAYTON, OHIO, ASSIGNOR TO THE BARNEY & SMITH CAR COMPANY, OF SAME PLACE.

MOTOR-CAR TRUCK.

SPECIFICATION forming part of Letters Patent No. 581,792, dated May 4, 1897.

Application filed February 17, 1897. Serial No. 623,861. (No model.)

*To all whom it may concern:*

Be it known that I, HENRY TESSEYMAN, of Dayton, county of Montgomery, State of Ohio, have invented new and useful Improvements in Street or Motor Car Trucks; and I do hereby declare the following to be a full, clear, and exact description of the invention, such as will enable others skilled in the art to which it appertains to make and use the same, reference being had to the accompanying drawings, and to the figures of reference marked thereon, as forming a part of this specification.

My invention relates to improvements in car-trucks, more particularly to the class known as "street" or "motor" car trucks, one of its objects being to provide an arrangement of spiral and half-elliptic springs whereby the weight of the car-body is equalized on either side of the truck-frame and a uniform easy motion thereby imparted to the car-body by the equal contraction and expansion of the springs, another of its objects being to provide a single pedestal-piece (preferably a casting) at each end of each journal, in which the spiral springs, truck side plates, and axle journal-boxes are held and have bearings, another of its objects being to provide a half-elliptic-spring seat located between the truck side plates, on which seat a half-elliptic spring rests with its outer end bearing against the body-plate and its inner end held by a hook-bolt passing down through the truck corner-plate and having its lower end screw-threaded, by which means the tension of the spring can be adjusted to cause its outer end to bear hard or easy against the body of the car, as occasion may require.

To these ends the invention consists of parts and their arrangements such as will be hereinafter fully described, pointed out in the claims, and which are fully illustrated in the accompanying drawings, in which—

Figure 1 is a side elevation of one end of a truck containing my improvements, the concealed parts thereof being shown by dotted lines; Fig. 2, a partial plan view thereof; Fig. 3, an end elevation of one side of the truck; Fig. 4, a sectional view through one of the journal-boxes on the line A A of Fig. 1; Fig. 5, a sectional view through one of the spiral-spring pockets on the line B B of Fig. 1; Fig. 6, a detached perspective view of the pedestal-piece; Fig. 7, an enlarged detached perspective view of one of the half-elliptic-spring pockets; Fig. 8, a sectional view through one of the holddown-springs on the line C C of Fig. 1; Fig. 9, a sectional view through one of the half-elliptic-spring seats on the line D D of Fig. 1; Fig. 10, an enlarged broken perspective view of one of the pedestal-caps and journal-box springs, and Fig. 11 a perspective view of one of the bridge-plates with a portion of one of the side bars and end sills attached.

In the drawings I have shown but one end of one side of my improved truck, which is sufficient to fully illustrate my invention, as both ends and both sides are identical in construction.

Similar reference-numerals indicate corresponding parts in all the figures of the drawings.

1 represents the body spring-plates upon which the body of the car is mounted.

2 and 3 are the inner and outer side bars or sills of the truck-frame. Truck corner or bridge plates 4 overlap the lower edges of the side bars 2 and are provided with back flanges 5, extending upwardly on the rear sides of the side bars 3 and having brackets 6, to which end-sills 38 are bolted, and they are also provided with webs 7 and 8, whose upper edges terminate in tubes 9 and 10, extending from side to side of the side bars, on the inside thereof, and form stiffeners or ties for the side bars, through which tubes and through the side bars bolts (not shown) pass, and by which the bridge-plates and the side bars are bolted firmly together. Through the centers of the bridge-plates and between the said webs (preferably so) bolts 11, having integral collars 12 and loose collars or washers 13, extend from above the top side of and through the body spring-plates to a suitable distance below the bridge-plates. Spiral springs 14 surround the bolts 11, between the washers 13 and the under side of the bridge-plates, the bolts 11 being secured to the body spring-plates by nuts 15, and the collars 13 being secured on the lower ends of said bolts by nuts 16, the function of springs 14 being to contribute easy upward movement to the car-body when its weight is thrown suddenly on either end thereof. The bridge-plates are perforated, preferably near their front ends and midway between the side bars, to receive bolts 17, whose upper ends I preferably terminate in hooks 18 and whose lower ends are screw-threaded to receive nuts 19 and jam-nuts 20. Spring-seats 21, provided with hangers 22, are secured to the side bars at or near their ends and carry half-elliptic springs 23, the inner ends of which engage the hooks 18 of bolts 17, their outer ends being carried in housings 24, secured to the under side of the body spring-plates near the ends thereof. It will be observed that by turning the nuts 19 and 20 bolts 17 can be adjusted vertically and tension on the outer ends of the springs 23, bearing against the under side of the car-body, regulated to suit varying loads and conditions. Various means have been employed to accomplish this result, but I know of no other arrangement that successfully meets the requirements of such a device, and I consider this particular feature of my invention of great importance in car construction.

To the under side of the car-body spring-plates, equidistant from the center vertical line of the axles 25, are attached (in pairs) spring-pockets 26, having their inner sides cut away at 27 to receive the ends of half-elliptic springs 28, located between the side bars and having their center bearings on the tops of journal-boxes 29 and their end bearings against the under sides of the heads of T-bolts 30, which penetrate the ends of said springs through oblong holes, as shown by dotted lines in Fig. 1.

31 represents pedestal-pieces having side flanges 32 extending upwardly from top plates 33, spiral-spring pockets 34, and sleeves 35, formed integral therewith, the latter being adapted to receive pedestal-caps 36. Openings 37 to receive the journal-boxes, and in which the same are movable vertically, are formed in the pedestal-pieces, the journal-boxes being of the usual form and construction and performing a well-known function. Below the journal-boxes and registering with the sleeves 35 of the pedestal-pieces the pedestal-caps 36, having pockets 39 to receive spiral springs 40, are mounted, as shown in Fig. 1, and which springs exert pressure against the under sides of the journal-boxes and which, in conjunction with the springs already described and those about to be described, complete the spring system by which an easy motion is imparted to the car-body.

Referring again to the pedestal-pieces 31 and to the half-elliptic-spring pockets 26, the side flanges 32 are bolted to the side bars 2 and 3, the top plates 33 being provided with openings 41 to provide for excessive movement of the said spring-pockets, the bottoms of which are perforated to correspond with similar perforations in the bottoms of the spiral-spring pockets 34 for the passage of the bolts 30, the lower ends of which are screw-threaded to receive nuts 42, by which they are retained in their relative positions. Surrounding the bolts 30 and incased by the spring-pockets 34 are spiral springs 43, whose lower ends find bearings on the bottoms of the said spring-pockets, their upper ends bearing against the under sides of the bottoms of the half-elliptic-spring pockets 26, as shown by dotted lines in Fig. 1. The hangers 22 carry scraper-boards 44 at their lower ends, which are provided with sockets or sleeves 45, within which ends pedestal-braces 46 are secured, their opposite ends being fastened in the outer sleeves 35 of the pedestal-pieces 31, an intermediate brace 47 being secured by the ends to the inner of said sleeves, whereby the structure is firmly braced longitudinally.

It will be observed that by integrally forming the pedestal-pieces, the spring pockets and seats, and the brace-sleeves in the manner described I lessen the number of parts heretofore employed to perform similar functions, increase the strength of the truck, decrease the labor required to fit and mount the parts so combined, and provide a more symmetrical and desirable fixture for the purpose for which the same is intended.

It is obvious that the details of construction may in some respects be modified without departing from the spirit of the invention, and I therefore do not wish to limit myself to the exact detail construction shown and described.

Having fully described my invention, I claim as new and desire to secure by Letters Patent—

1. In a car-truck, the combination of half-elliptic springs having their center bearings attached to the side bars or sills at or near the ends thereof, their outer ends having bearings against suitable surfaces on the under side of the car-body, and adjustable means for supporting the inner ends of said springs whereby the tension of said springs may be regulated to accommodate varying loads and conditions, substantially as set forth.

2. In a car-truck, half-elliptic springs having their center bearings over the journal-boxes of said truck and their free ends held in pockets depending from the car-body, spiral springs located substantially equidistant from the said journal-boxes and having their upper ends bearing against the under side of the bottoms of said pockets and their lower ends carried on seats suitably arranged therefor, the said half-elliptic springs being held under tension by bolts which engage their free ends and extend therefrom, within the said spiral springs and through the under side of the seats for the lower ends thereof where they engage tightening-nuts, in combination with half-elliptic springs having their center bearings attached to the side sills of the truck-frame at or near the ends thereof, the outer ends of the said springs having bearings against suitable surfaces on the under side of the car-body, and adjustable means for supporting the inner ends of said springs, whereby the tension of said springs may be regulated to accommodate varying loads and conditions, substantially as set forth.

3. In a car-truck, half-elliptic springs having their center bearings over the journal-boxes of said truck and their free ends held in half-elliptic-spring pockets depending from the car-body, pedestal-pieces, provided with openings to receive the journal-boxes, spiral-spring pockets located substantially equidistant from said journal-boxes and formed integral with said pedestal-pieces, spiral springs located within said pockets with their upper ends bearing against the under side of the bottoms of the said half-elliptic-spring pockets and their lower ends resting on the bottoms of said spiral-spring pockets, in combination with flanges formed integral with said pedestal-pieces, whereby the latter is secured to the side bars of the truck, and means for connecting the free ends of the said half-elliptic springs with the under side of the said spiral-spring pockets, substantially as set forth.

4. In a car-truck, half-elliptic springs having their center bearings over the journal-boxes of said truck and their free ends held in half-elliptic-spring pockets depending from the car-body, pedestal-pieces provided with openings to receive the journal-boxes, spiral-spring pockets located substantially equidistant from said journal-boxes and formed integral with said pedestal-pieces, spiral springs located within said pockets with their upper ends bearing against the under side of the bottoms of said half-elliptic-spring pockets and their lower ends resting on the bottoms of said spiral-spring pockets, bolts for connecting the free ends of the said half-elliptic springs with the under side of the said spiral-spring pockets, and flanges formed integral with the said pedestal-pieces whereby the latter are secured to the side bars of the truck-frame in combination with half-elliptic springs having their center bearings attached to the side sills, or side bars, of the truck-frame at or near the ends thereof, their outer ends having bearings against suitable surfaces on the under side of the car-body, and adjustable means for supporting the inner ends of said springs whereby the tension of said springs may be regulated according to varying loads and conditions, substantially as set forth.

5. As an improvement in car-trucks, a pedestal-piece provided with an opening to receive the journal-box, a spiral-spring pocket located at each side of said opening and having a spring-seat in the bottom of each of said pockets, and flanges for securing the said pedestal-piece to the side bars of the truck, the whole being formed in a single piece, substantially as described.

Witness my hand to the foregoing specification on this 15th day of February, 1897.

HENRY TESSEYMAN.

In presence of—
E. L. LELAND,
C. U. RAYMOND.